March 30, 1971 L D PERCIVAL KING 3,573,167
KINETIC INTENSE NEUTRON GENERATOR REACTOR
Filed June 6, 1968
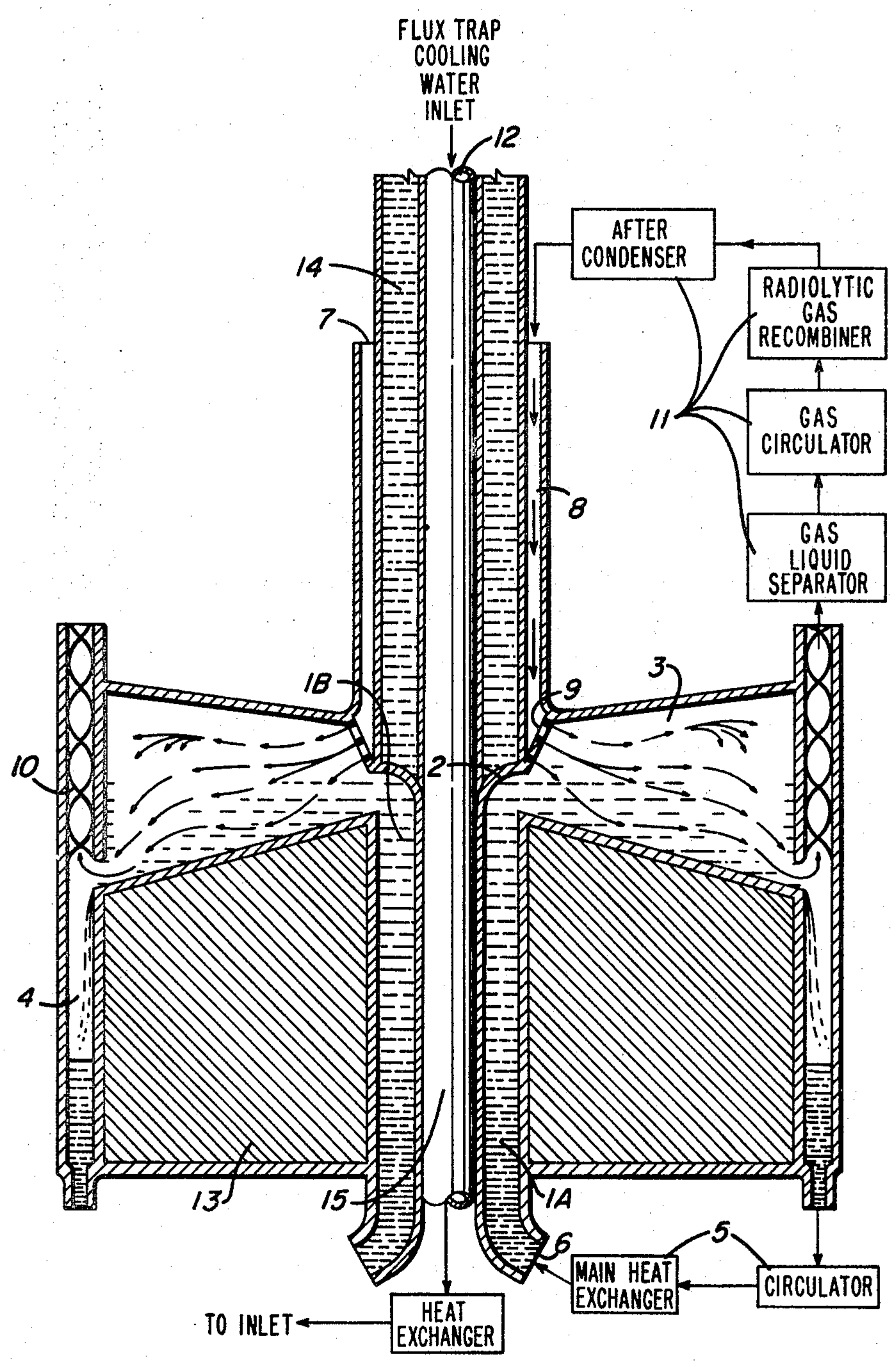
INVENTOR.
L.D. Percival King
BY
[signature]
Attorney United States Patent Office 3,573,167
Patented Mar. 30, 1971

1

3,573,167
KINETIC INTENSE NEUTRON GENERATOR REACTOR

L D Percival King, Santa Fe, N. Mex., assignor to the United States of America as represented by the United States Atomic Energy Commission Filed June 6, 1968, Ser. No. 734,961
Int. Cl. G21c 3/46, 1/24
U.S. Cl. 176—47 1 Claim

ABSTRACT OF THE DISCLOSURE

A nuclear reactor capable of producing on a continuous basis an intense neutron flux, said reactor comprising a small core region, a large containment vessel, pumping means to continuously and rapidly move a liquid nuclear fuel through the core and inject it into the said vessel in such a manner that the geometry of the fuel in the core under static conditions is supercritical.

The invention described herein was made in the course of, or under, a contract with the U.S. Atomic Energy Commission.

Very high neutron fluxes are of interest for several types of basic physics and solid-state research as well as for the production of transuranic elements. One of the unusual features of nuclear reactors is that in principle the power output is independent of their size. It is determined essentially by the rate at which heat can be removed from the core. Present steady-state high flux reactors are limited for this reason to a flux level of about $4 \times 10^{15}$ neutrons/cm.$^2$-sec. Pulsed reactors can produce higher fluxes by using the time between pulses to extract the heat. For example, U.S. Pat. No. 3,359,172 entitled, "Liquid Excursion Pulsed Reactor," by L D Percival King discloses the projecting of a highly supercritical slug of liquid fuel from a heavily poisoned region into a large cavity. The liquid slug is then violently disrupted across the cavity and deposited over the large cooled internal surface area of the cavity. The heat is extracted in this large cavity before the next pulse.

A new reactor concept for obtaining superhigh neutron fluxes is the creation of a liquid fuel geometry within which the neutron fluxes and peak powers observed in burst experiments are maintained on a continuous basis. The principle of operation is similar to that in a flame or jet engine except that neutrons replace the normal propagation front and no oxidizer is required to burn the uranium supplied by the liquid fuel. A cylinder with a deflector at the open upper end serves as the core, or "burning" chamber. Cold fuel is continuously supplied at the bottom of the chamber at a rate which provides the desired power level. The cylinder volume is such as to permit only a slight excess reactivity when it is full of hot fuel ($\leq 200°$ C.). Since only a very small amount of the uranium is burned to heat the fuel in its passage through the core, the fuel is ejected as a radial jet from the upper end of the cylinder into a containment vessel. The nature and violence of the jet dispersal as evidenced by internal pressure is comparable to that achieved in nuclear burst experiments under similar volume and total energy deposition rates, i.e., $\leq 300$ p.s.i. Operating conditions of the reactor of this invention in the core region have characteristics of both dynamic and static conditions. Excess reactivity produced by the jet is small due to the rapid radial jet dispersal. The advantages of the reactor of this invention used as a superflux neutron generator are numerous.

(1) The total power output is limited only by the total fuel heat capacity and its pumping rate through the burning chamber. Normal heat transfer limitations do not exist since the heat exchanger is outside of the core and can be distributed in any desired configuration. Fluxes of $10^{17}$ are achievable at a power of 500 mw. when a beryllium reflector with minimum critical mass geometry is used. The desired power densities are achieved by a combination of fuel velocity, temperature rise and system pressure.

(2) The specific power of any particular fuel volume does not have to exceed values already achieved in liquid burst systems.

(3) Fuel processing, fission produce removal, and uranium additions are made on a continuous, or batch, basis without costly fuel element fabrication.

(4) Little if any new technology is required; corrosion-resistant materials, in particular titanium, for fuel containment at $\leq 200°$ C. are well known, pumping velocities are within common practice, and the dilution and recombination of radiolytic gas is well understood.

(5) The low temperature stability of the uranyl sulfate fuel has been demonstrated.

(6) Safe handling of relatively large volumes of aqueous uranium solutions is common practice in production plants.

(7) Calculations and experiments have confirmed the inherent nuclear safety of small homogeneous reactors. The fuel concentration, furthermore, is chosen to require a minimum solution volume in the reacting region. The small excess reactivity requirements built into the system need only be sufficient to produce an average core fuel temperature rise of about 100° C. The available excess reactivity cannot be exceeded by any known mechanism within the core.

(8) A flux trap which serves as a peak flux irradiation facility is incorporated as an axial cylinder within the central core chamber.

Other advantages of this invention will be apparent from the following description when read in connection with the accompanying drawing in which the figure is a schematic drawing showing the principles involved in the preferred embodiment of this invention and showing some of the parts of this reactor in cross section.

The figure shows a fuel region 1A in which no radiolytic gas has yet formed and an upper fuel region 1B which has been diluted approximately 15 percent due to the formation of radiolytic and fission product gases of the fuel. As the fuel moves up the core 1B it is deflected into gas containment vessel 3 by deflector 2. The fuel containing the radiolytic and fission product gases is vigorously mixed with a helium-oxygen gas mixture which enters through the annulus 8 and is in communication with vessel 3 through apertures 9. The helium-oxygen mixture entraps fission product gases, radiolytic gases, and liquid fuel with the fuel being condensed by a reflux condenser 10. The condensed fuel in the form of droplets flows into the fuel sump region 4 and then is pumped through the main heat exchanger 5 where most of the heat is extracted before being recycled into the core inlet 6. The gas entrapped fuel that is not separated by reflux condenser 10 is separated in the gas-liquid separator and is returned to fuel sump 4 through condenser 10. The radiolytic gas and fission product gas continues through the recombiner system. This system 11 is comprised of the gas-liquid separator, a gas circulator, radiolytic gas recombiner and an after condenser.

The helium-oxygen diluent gas will strip the radiolytically produced hydrogen and oxygen and fission gases from the fuel in the containment vessel 3. Initial gas-fuel separation is accomplished in the reflux condenser region 10 from where the gas continues into the radiolytic gas recombiner system 11. Here any remaining fuel is stripped from the gas by a gas-liquid separator. The gas circulator pumps the gases into the recombiner chamber where the radiolytic hydrogen and oxygen are recombined at high temperature into water. The resulting steam diluent gas and fission product gases then pass through an after condenser where the steam is condensed and the resulting water returned to the fuel through inlet 7 and annulus 8. The diluent gas and fission product gases are then recirculated. Fission product gases are continually, or batchwise, bled from the gas circulating system and adsorbed in activated charcoal beds for decay and final disposal (not shown). The main sample area 15 is where maximum neutron fluxes are obtained, said sample area being cooled by water flowing down pipe 12 through the heat exchanger and then being recirculated. A beryllium reflector 13 surrounds the core area and functions a neutron reflector while ordinary water 14 is used as a shield plug to moderate or stop neutrons coming from the sample region 15.

The following table summarizes typical operating characteristics of the reactor of this invention as used in the above embodiment.

TABLE

| | |
|---|---|
| Power | 0–500 mw. |
| Average temperature coefficient of reactivity, δk./k./° C. | $-4.27\times10^{-4}$. |
| Mass coefficient of reactivity, δk./k./g.$^{235}$U | $1.92\times10^{-4}$. |
| Total excess reactivity | 0.04%, 5$. |
| Core: | |
| Fuel region, cm. | 6.3 (annulus). |
| Central flux trap, cm. | 8.2 (diameter). |
| Beryllium reflector thickness, cm. | ~50 (sides only). |
| Cold critical volume, liters | 11.6. |
| Cold operating volume, liters | 14.5. |
| Cold critical core height, cm. | 40. |
| Operating core height, cm. | 50. |
| Reactivity control | Fuel temperature. |
| Fuel inlet temperature, ° C. | 35. |
| Fuel outlet temperature, ° C. | 200. |
| Fuel ΔT in core, ° C. | 165. |
| Core fuel velocity, cm./sec. | ~0–2000. |
| Core overpressure, p.s.i.a. | 250. |
| Minimum core residence time, msec. | 25. |
| Maximum exit gas void fraction, percent | 16. |
| Specific core power, mw./liter | 34.5. |
| Fission product inventory, fissions/day | $2.7\times10^{23}$. |
| Minimum fuel inventory, liters (10-sec. operation or cycle time) | 5800. |
| Minimum uranium inventory, kg. $^{235}$U | 435. |

It is understood that the principal separation of gas and liquid occurs by gravity in the gas-liquid containment vessel with the liquid running down the sloping bottom of this vessel 3 into the sump 4. Any entrained liquid is further removed by the reflux condenser 10 and finally the liquid-gas separator 11.

Startup is accomplished by slowly filling the core volume with cold solution. Since this volume is larger than the cold critical requirements, the fission process is initiated and a strong neutron or ignitor source is produced. Fuel pumping can now begin since the neutron source will continue to ignite any new fuel additions no matter at what rate it is pumped into the core region. Operation is not dependent on the normal delayed neutrons since reflector neutrons serve as an ever-present delayed neutron source.

Although the preferred embodiment teaches uranyl sulfate as a fuel, the scope of possible fuels is limited to any fissionable liquid fuel system, such as fused salts or liquid metals, and other aqueous fuels, for example, uranyl phosphate solution. Furthermore, as set forth above, the reactor is intended as a neutron source; however, other applications would include (a) the direct conversion of nuclear energy into mechanical or electrical power by the addition of a turbine system in place of the deflector 2, and (b) a power generating reactor by extracting heat energy from the main heat exchanger 5.

What I claim is:

1. A kinetic intense neutron generator utilizing liquid fuel and comprising:
   (a) an annular core region having a lower inlet and an upper outlet, said annular core region being formed by two vertically oriented concentric cylinders and having a fuel deflector at its outlet in fluid communication with a gas-liquid containment vessel;
   (b) a reflector surrounding said core region;
   (c) a diluent gas aperture through which a helium-oxygen mixture is flowed for entraining said fuel, radiolytic gases and fission product gases, said aperture being positioned above the fuel deflector and in fluid communication with the fuel deflector and in fluid communication with said containment vessel;
   (d) the containment vessel being in fluid communication with said aperture and said upper outlet, and also in fluid communication with a reflux condenser means and a liquid fuel return sump;
   (e) the said reflux condenser means being in further fluid communication with a radiolytic gas recombiner means that recycles the diluent gas through the said aperture; and
   (f) the said fuel sump being connected to a pumping and heat exchange means and then to the fuel core inlet.

References Cited

UNITED STATES PATENTS

| | | | |
|---|---|---|---|
| 2,961,391 | 11/1960 | King | 176—46X |
| 3,052,613 | 9/1962 | Wigner et al. | 176—46X |
| 3,088,895 | 5/1963 | Petrick et al. | 176—46X |
| 3,151,031 | 9/1964 | Lindstrom | 176—46X |
| 3,166,480 | 1/1965 | Lindstrom | 176—47 |

BENJAMIN R. PADGETT, Primary Examiner

H. E. BEHREND, Assistant Examiner

U.S. Cl. X.R.

176—52